United States Patent
Miyake et al.

(10) Patent No.: US 9,468,042 B2
(45) Date of Patent: Oct. 11, 2016

(54) APPARATUS FOR PRODUCING TRICHLOROSILANE

(75) Inventors: Masami Miyake, Naka-gun (JP); Kazuki Mizushima, Saitama (JP); Wataru Saiki, Hitachinaka (JP); Naoya Murakami, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 13/064,106

(22) Filed: Mar. 7, 2011

(65) Prior Publication Data

US 2011/0215084 A1    Sep. 8, 2011

(30) Foreign Application Priority Data

Mar. 8, 2010   (JP) .................. 2010-050381

(51) Int. Cl.
*H05B 3/02*   (2006.01)

(52) U.S. Cl.
CPC ..................................... *H05B 3/02* (2013.01)

(58) Field of Classification Search
USPC .................. 392/485, 491, 493; 422/199, 211
See application file for complete search history.

(56) References Cited

U.S. PATENT DOCUMENTS

| 3,541,304 | A | * | 11/1970 | Cohn ............................ 392/485 |
| 4,233,494 | A | * | 11/1980 | Pawlik et al. ................ 392/488 |
| 4,536,642 | A | * | 8/1985 | Hamster et al. ............. 392/492 |
| 7,881,594 | B2 | * | 2/2011 | Fang et al. .................... 392/485 |
| 7,964,155 | B2 | * | 6/2011 | Ishii et al. ..................... 422/198 |
| 2007/0073075 | A1 | | 3/2007 | Paetzold et al. |

FOREIGN PATENT DOCUMENTS

| CN | 101421190 A | 4/2009 |
| JP | 60-049021 A | 10/1985 |
| JP | 3781439 B2 | 10/1994 |
| JP | 2004-262753 A | 9/2004 |
| JP | 2007-091587 A | 4/2007 |

\* cited by examiner

*Primary Examiner* — David Angwin
*Assistant Examiner* — Amit K Singh
(74) *Attorney, Agent, or Firm* — Locke Lord LLP (57) ABSTRACT

An apparatus for producing trichlorosilane from raw gas containing silicon tetrachloride and hydrogen, having: a reaction chamber being supplied with the raw gas for generating reacted gas containing trichlorosilane and hydrogen; a plurality of heaters heating the raw gas and having exothermic portions being disposed along a vertical direction in the reaction chamber; a plurality of electrodes being connected to basal portions of the heaters; and a radiation plate being disposed between the exothermic portions of the heaters.

5 Claims, 10 Drawing Sheets

APPARATUS FOR PRODUCING TRICHLOROSILANE

BACKGROUND OF THE INVENTION

1. Field of the Invention

The present invention relates to an apparatus for producing trichlorosilane converting silicon tetrachloride to trichlorosilane.

Priority is claimed on Japanese Patent Application No. 2010-50381, filed on Mar. 8, 2010, the content of which is incorporated herein by reference.

2. Description of the Related Art

High-purity trichlorosilane ($SiHCl_3$) used as a raw material for producing silicon (Si) can be produced by reacting silicon tetrachloride ($SiCl_4$) with hydrogen gas so as to convert.

Silicon is produced by reductive reaction and thermal decomposition reaction of trichlorosilane according to below reaction formulas (1) and (2). Trichlorosilane is produced by conversion reaction according to below reaction formula (3).

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing trichlorosilane, for example, a reaction vessel in which a two-layered reaction chamber is made by two concentric tubes so as to have an outer chamber and an inner chamber and in which a heating element is disposed around the exterior of the outer reaction chamber is suggested in Japanese Patent Application Publication No. 3781439 and Japanese Unexamined Patent Application First Publication No. 2004-262753. In this reaction vessel, by heating the inside of the reaction chamber from the exterior by the heating element made of carbon or the like which generates heat by electricity, the gas in the reaction chamber is reacted.

In Japanese Examined Patent Application Publication No. S60-49021, an apparatus in which a plurality of pipe-shaped heaters are disposed in a reaction chamber so that gas is directly heated in the reaction chamber and in the heaters is disclosed.

It is necessary to heat the reaction chamber with high thermal efficiency for the apparatus for producing trichlorosilane.

BRIEF SUMMARY OF THE INVENTION

However, according to the constitutions of the Japanese Patent Application Publication No. 3781439 and Japanese Unexamined Patent Application First Publication No. 2004-262753, although heating elements disposed on the exterior of the reaction chamber heat the inside of the reaction chamber, it is disadvantageous that the thermal efficiency is low since radiation heat radiated radially outward from the heating elements cannot be used efficiently.

If a heater is disposed inside the reaction chamber as disclosed in Japanese Examined Patent Application Publication No. S60-49021, a structure such as an electrode is necessary to supply electric current for an installation site of the heater. Therefore, a constitution for isolating and cooling the structure for the electrode, and a sealing structure for a pass-through part of the reaction chamber and the like should be formed. Therefore, the installation site of the heater is complicated because of the closely-located structures, so that the larger number of the heaters for high-capacity, the more the workability for fabricating and checking deteriorates.

Generally, in the apparatus for producing trichlorosilane, in order to prevent the generation of impurities in high-temperature condition, carbon members coated with silicon carbide are used for the reaction vessel or the heater. In the apparatus for producing trichlorosilane, it is required to heat effectively the inside of the reaction chamber to the reaction temperature of trichlorosilane with high thermal efficiency. On the other hand, if the temperature of the heater is excessively increased, the silicon carbide coating on the heater surface is damaged so that carbon is exposed and the impurities are generated from carbon. Therefore, it is necessary to increase the high-temperature area of the surface of the heater with suppressing the highest temperature below the limit value.

According to the constitution of Japanese Examined Patent Application Publication No. S60-49021, the temperature of the inner surface of the pipe-shaped heater is apt to increase since the high-temperature gas flows therein. Consequently, in order to maintain the temperature of the pipe-shaped pipe below the limit value, it is necessary to decrease the output of the heater. As a result, the temperature of the apparatus is decreased inefficiently.

The present application is achieved in consideration of the above circumstances, and has an object of providing an apparatus for producing trichlorosilane having a high workability for fabricating and checking by a simple structure in which the highest temperature on a surface of a heater can be restrained in a reaction chamber and in which supplied gas can be heated with high-thermal efficiency by increasing a heat transfer area in the reaction chamber.

The preset invention is an apparatus for producing trichlorosilane from raw gas including silicon tetrachloride and hydrogen, having: a reaction chamber being supplied with the raw gas for generating reacted gas including trichlorosilane and hydrogen; a plurality of heaters heating the raw gas and having exothermic portions being disposed along a vertical direction in the reaction chamber; a plurality of electrodes being connected to basal portions of the heaters; and a radiation plate being disposed between the exothermic portions of the heaters.

According to the apparatus for producing trichlorosilane, since the heaters are provided in the reaction chamber, the heat of the heaters is directly transferred to the raw gas flowing around the heaters, so that the raw gas can be heated with high-thermal efficiency. Also, if the reaction chamber is large, the heaters can be arranged at the necessary portions therein since it is provided in the reaction chamber.

In addition, in the apparatus for producing trichlorosilane according to the present invention, the radiation plate is disposed between the exothermic portions of the heaters.

At surfaces of the heaters being faced each other, heat is not so absorbed compared to a case in which the heaters being faced non-heating surface, so that the temperature of the heaters is increased. Therefore, if the radiation plate is disposed so that the heaters do not face to each other, the highest temperature of the heater surfaces can be decreased.

The temperature of the radiation plate is raised by the radiation heat from the heaters, so that the raw gas can be efficiently heated. Furthermore, the heat of the radiation plate radiates, so that the wall surface in the reaction chamber can be heated. As a result, a high-temperature area for heat-transferring in the reaction chamber can be increased, so that the raw gas can be heated with high thermal efficiency.

Also, since the radiation plate heats the raw gas, the number of the heaters can be reduced by arranging the radiation plates at an appropriate number. Since the radiation plate does not need a structure for supplying electricity such as an electrode, a bottom or the like of the reaction chamber can be simplified, so that the apparatus for producing trichlorosilane having the fine workability for fabricating and checking can be achieved.

In the apparatus for producing trichlorosilane of the present invention, the heaters are arranged in the reaction chamber along two or more concentric circles, and the radiation plate is arranged between the circles of the heaters.

The plurality of heaters are serially-connected in circles via the electrodes along the circumferential direction in the reaction chamber. The radiation plate is arranged between the circles of the heaters so as to intercept facing the heaters' circles with each other. Therefore, the radiation plate receives heat from the heaters arranged at both sides thereof, so that the reaction chamber can be heated by the radiation heat of the radiation plate. Furthermore, the highest temperature of the heaters can be suppressed.

Furthermore, the raw gas flows along the heaters and the radiation plate which are arranged to be faced each other, so that the raw gas can be heated directly from the heaters and the radiation plate with high thermal efficiency. As a result, the conversion rate to trichlorosilane can be improved.

In the apparatus for producing trichlorosilane according to the present invention, it is preferable that: a gas introducing port communicating with a lower part of the reaction chamber and introducing the raw gas into the reaction chamber be provided; and a joint portion of the heaters and the electrode be arranged at the lower part of the reaction chamber.

Since the heaters are disposed in the reaction chamber, the heat of the heaters is directly transferred to the raw gas flowing around the heaters, so that the raw gas can be heated with high thermal efficiency. However, in this case, the electrodes are also disposed in the reaction chamber. Therefore, the vicinity of the joint portions of the heaters and the electrodes are disposed at lower part of the reaction chamber, and exposed to the raw gas. As a result, the impurities are likely to be generated. Furthermore, since the electrodes are connected to a power supply at the outside of the reaction chamber, it is necessary to cool the electrodes. Moreover, it is necessary to provide insulating and sealing with respect to the bottom plate.

In the apparatus for producing trichlorosilane according to the present invention, the gas introducing port of the raw gas is provided at the lower part or the basal portion of the reaction chamber; and the joint portions of the heaters and the electrodes are arranged at the lower part of the reaction chamber. Therefore, comparatively low-temperature raw gas that is introduced via the gas introducing port is in contact with the joint portions, so that temperature of the joint portions is prevented from increasing. As a result, the generation of impurities is prevented; and it is easy to design the cooling constitution or the like at the joint portions.

In the apparatus for producing trichlorosilane, it is preferable that the radiation plates be radiation cylinders being arranged around the heaters.

Furthermore, it is preferable that a plurality of gas introducing ports introducing the raw gas into the reaction chamber through a lower part of the reaction chamber be arranged at intervals, and an opening which is faced toward the gas introducing port be formed at the radiation cylinder. In this case, the opening may be provided so as to penetrate the radiation cylinder.

Each the radiation cylinder is provided around each of the heaters, and the raw gas is introduced via the openings of the radiation cylinders, so that the raw gas flows through a vertical space which is formed by a heater and a radiation cylinder. That is to say, the raw gas flows between the exothermic portions and the radiation cylinders, so that the heat of the high-temperature portions is directly transferred to the raw gas. As a result, the raw gas can be heated with high-thermal efficiency, and the conversion rate to trichlorosilane can be improved. Also, since the radiation plate has a cylindrical shape, the heaters can be prevented from facing each other, so that the highest temperature of the surfaces of the heaters can be decreased.

Effects of the Invention

According to the apparatus for producing trichlorosilane of the present invention, since the heaters are arranged in the reaction chamber, heat of the heaters is transferred directly to the raw gas, so that the raw gas can be heated with high thermal efficiency, thereby further improving the conversion ratio to trichlorosilane. Furthermore, the radiation plate is provided around the heater. Therefore, the highest temperature of the surface of the heater can be suppressed. Moreover, the high-temperature area at the surfaces of the heaters and the radiation plate is increased. As a result, the high-reaction efficiency can be obtained. Furthermore, since the radiation plate without an electrode can heat efficiently, the constitution of the heaters can be simplified, so that the workability for fabricating and checking can be improved.

DETAILED DESCRIPTION OF THE INVENTION

Hereinafter, an embodiment of the apparatus for producing trichlorosilane according to the present invention will be described.

Figure 1:
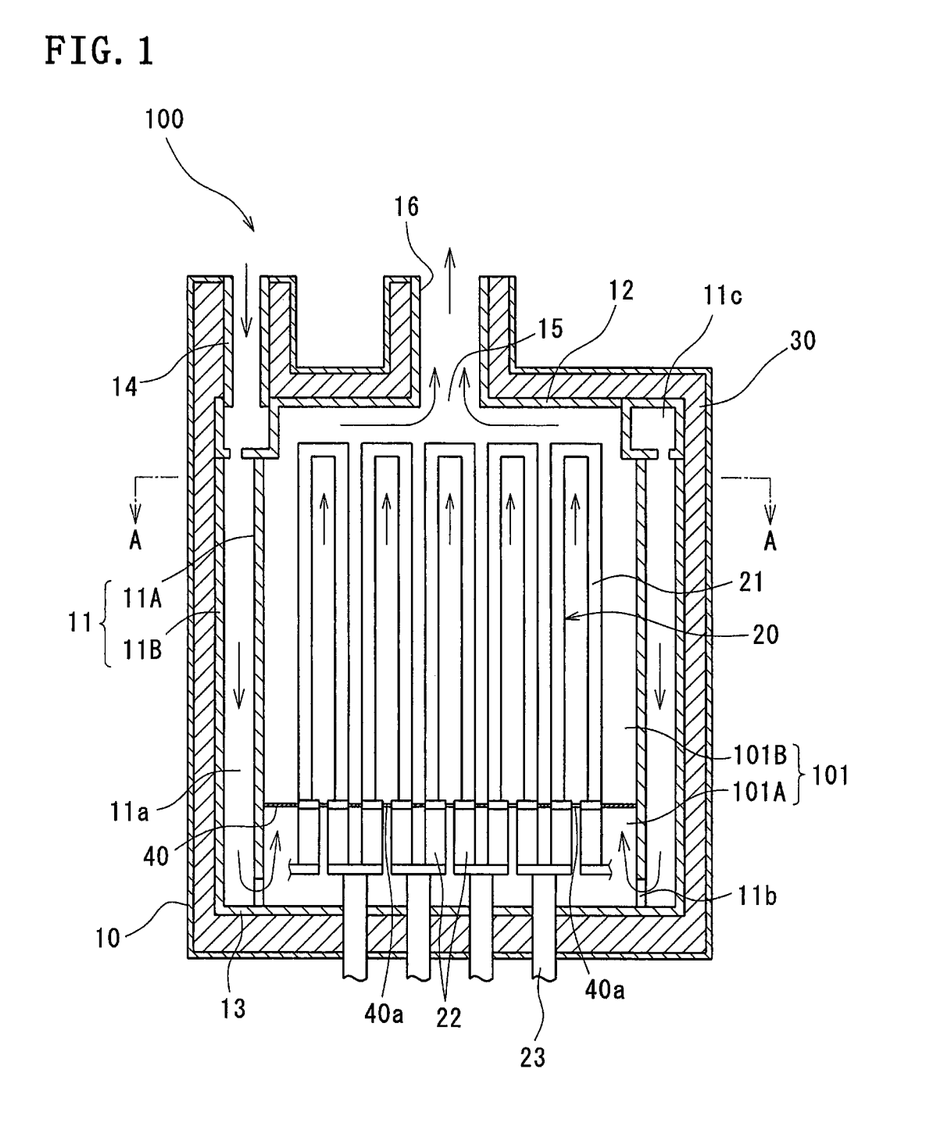
FIG. 1 is a vertical cross-sectional view showing the first embodiment of the apparatus for producing trichlorosilane according to the present invention.

An apparatus for producing trichlorosilane 100 of trichlorosilane of the present embodiment is an apparatus for producing trichlorosilane by heating raw gas including silicon tetrachloride and hydrogen so as to generate reacted gas including trichlorosilane and hydrogen chloride and the like by conversion reaction. As shown in FIG. 1, the apparatus for producing trichlorosilane 100 has a reaction vessel 10 in which the raw gas is supplied, a plurality of heaters 20 that are provided in the reaction vessel 10 and heat the raw gas, and a plurality of electrodes 23 that are connected to lower ends of the heaters 20. The reaction vessel 10 has a thermal insulated container 30 so that the heating efficiency is prevented from decreasing as a result of the radiation of the heat of the heaters 20 from the reaction vessel 10.

The reaction vessel 10 is provided with a substantially cylindrical wall body 11, a top plate 12 which covers an upper end of the wall body 11, and a bottom plate 13 which closes a bottom end of the wall body 11.

The wall body 11 is provided with a substantially cylindrical inner wall 11A and a substantially cylindrical outer wall 11B that are arranged concentrically. Between the inner wall 11A and the outer wall 11B, a cylindrical space (i.e., a cylindrical path 11a) is formed. The outer wall 11B is connected to the bottom plate 13 and is closed at the bottom end. The inner wall 11A is arranged so that a bottom end thereof is in contact on the bottom plate 13. In the vicinity of the joint portion of the inner wall 11A and the bottom plate 13, a plurality of gas introducing ports 11b communicating a cylindrical path 11a and an inner space of the inner wall 11A is formed so as to penetrate the inner wall 11A. The gas introducing ports 11b are formed at substantially even intervals (45° in the present embodiment) in a circumferential direction so as not to generate a drift current of the gas.

In the wall body 11, an annular path 11c is provided so as to be connected to an upper part of the cylindrical path 11a. A raw gas supply pipe 14 is connected to an upper part of the annular path 11c. A gas-discharge port 15 that discharges the reacted gas to the outside of the apparatus is provided so as to penetrate a center of the top plate 12 that covers the upper end of the wall body 11. A discharge pipe 16 extending upward is provided at the gas-discharge port 15.

Figure 2:
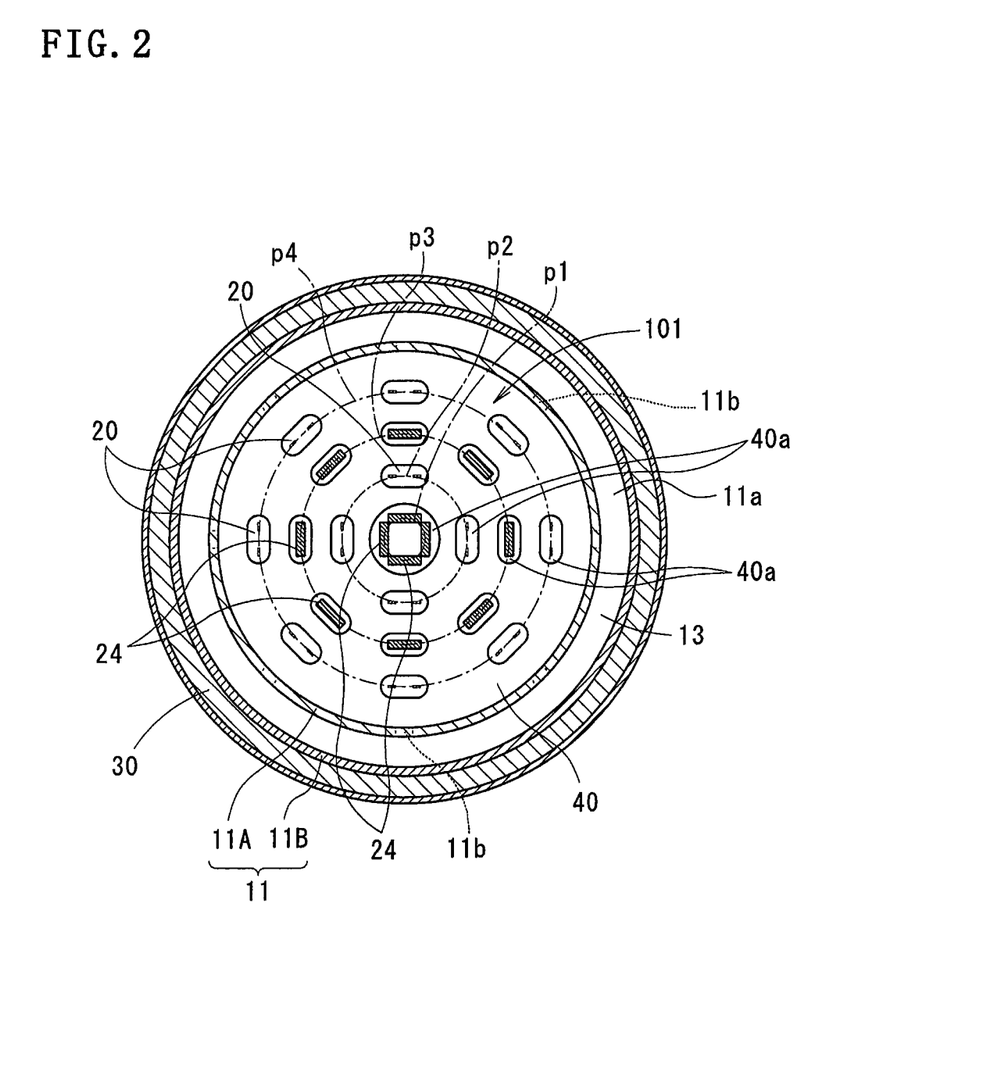
FIG. 2 is a cross-sectional view taken along the line A-A of FIG. 1.

The bottom plate 13 of the reaction vessel 10 is connected to the bottom end of the outer wall 11B and closes the bottom end of the wall body 11. As shown in FIG. 2, the heaters 20 and radiation plates 24 stand on the bottom plate 13 so as to form concentric multiple circles.

The top plate 12 of the reaction vessel 10 is connected to the upper ends of the wall body 11, and covers the upper end of the wall body 11. The space that is surrounded by the top plate 12, the wall body 11 (the inner wall 11A), and the bottom plate 13 in which the heaters 20 and the radiation plates 24 stand is a reaction chamber 101 in the apparatus for producing trichlorosilane 100 of trichlorosilane.

Figure 3:
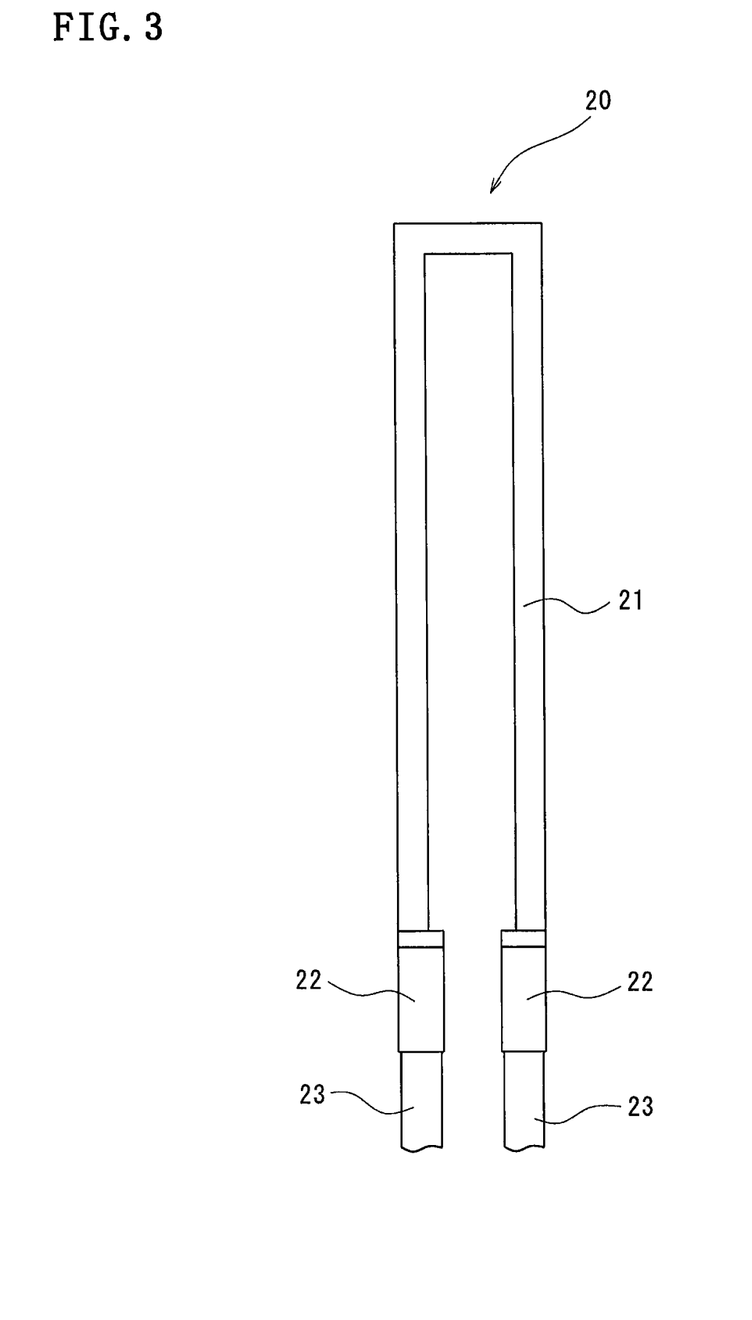
FIG. 3 is a side view showing the heater.

Each of the heaters 20 that heats the raw gas in the reaction chamber 101 is constituted from a plate-shaped exothermic portion 21 that is heated by being supplied with current from the electrodes 23, and a basal portion 22 that holds the exothermic portion 21 in which the resistance heat-generation quantity is low. As shown in FIG. 3, the exothermic portion 21 is formed in an inverted U-shape extending upward, and the both ends thereof are connected to the electrodes 23 via the basal portions 22. The electrodes 23 and the heaters 20 are made of carbon, and the surfaces thereof are coated by silicon carbide. However, the connecting faces of the electrodes 23 and the heaters 20 are not coated for conducting.

Each of the electrodes 23 is provided so as to penetrate the bottom plate 13 of the reaction chamber 101 and electrically connects the adjacent heaters 20, so that the heaters 20 (for example, four heaters) are connected in series. The heaters 20 that are connected in series are connected in parallel and supplied electric current. Consequently, the exothermic portions 21 are resistively heated, and then the raw gas in the reaction chamber 101 can be heated.

Figure 4:
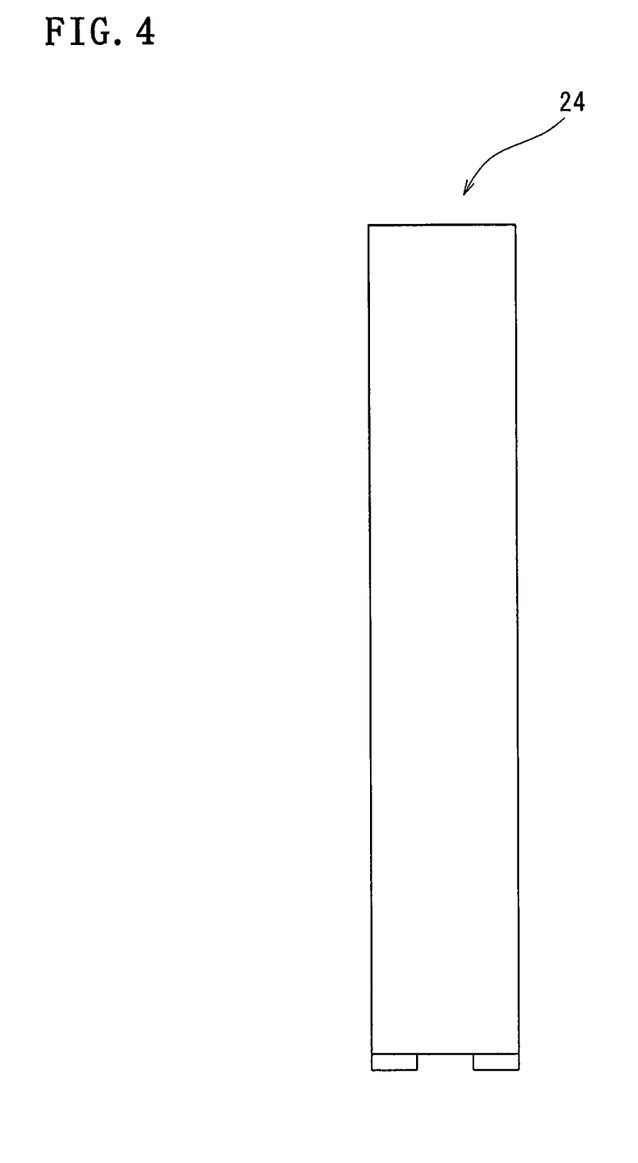
FIG. 4 is a side view showing the radiation plate.

As shown in FIG. 4, the radiation plates 24 are formed into flat plates having substantially same heights as the exothermic portions 21 of the heaters 20. The radiation plates 24 are made of carbon and coated by silicon carbide.

The heaters 20 and the radiation plates 24 are disposed in the reaction chamber 101 so as to form four concentric circles as shown in FIG. 2. An innermost circle p1 and a circle p3 are constituted from the radiation plates 24. A circle p2 between the circles p1 and p3, and an outermost circle p4 are constituted from the heaters 20.

Figure 5:
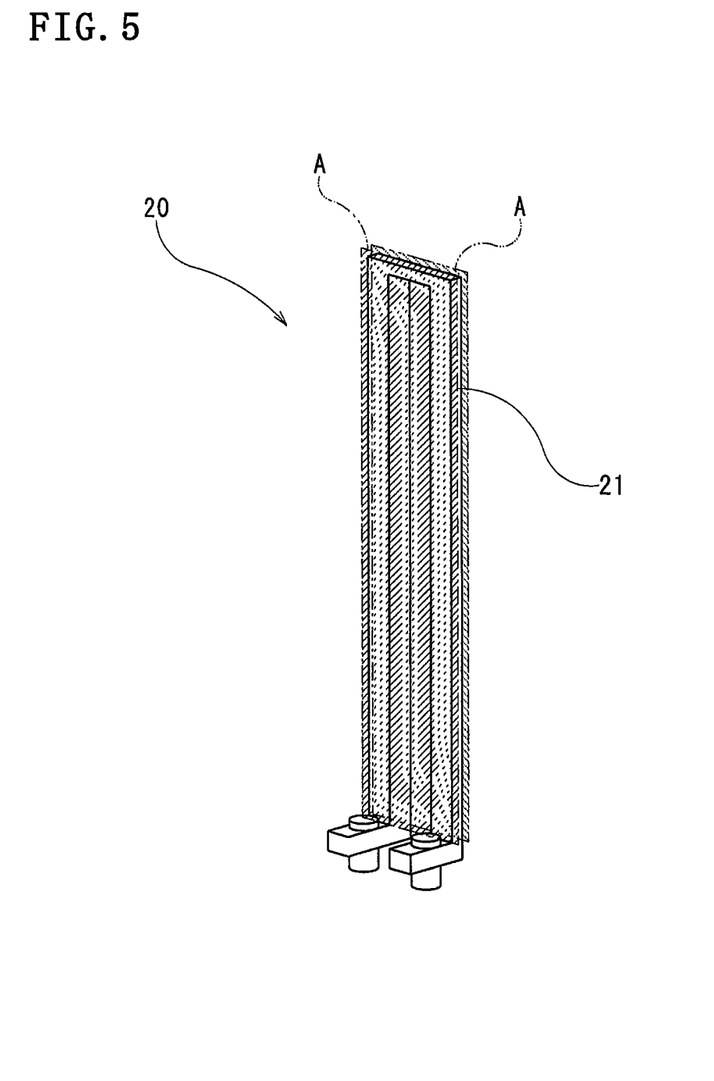
FIG. 5 is a perspective view showing the assumed heating surface of the heater.

With respect to the exothermic portion 21 having the inverted U-shape, if assumed heating surfaces A are defined as shown in FIG. 5, the radiation plates 24 are disposed between the adjacent heaters 20 so that the assumed heating surfaces A of the heaters 20 are not in face-to-face state. Therefore, the radiation plates 24 are heated by receiving the heat of the exothermic portions 21, so that the surfaces of the exothermic portions 21 are prevented from excessive heating. Also, an area of heat-transferring in the reaction chamber 101 is increased, so that the raw gas can be efficiently heated.

In the present embodiment, the radiation plates 24 are disposed between the assumed heating surfaces A of the heaters 20. It is not necessary for the radiation plates 24 to be disposed between the heaters 20 in which the assumed heating surfaces A are not faced.

At the level of the upper end of the basal portions 22 of the heaters 20, a dispersing plate 40 is arranged so as to be disposed substantially horizontally above the gas introducing port 11b. The dispersing plate 40 has gas communicating holes 40a in accordance with the arrangement of the heaters 20 and the radiation plates 24 in the reaction chamber 101. By arranging the dispersing plate 40 as above, the reaction chamber 101 is divided into a low-temperature lower part 101A in which the basal portions 22 connecting the electrodes 23 and the heaters 20 are provided and the raw gas is introduced, and a high-temperature upper part 101B in which the exothermic portions 21 of the heaters 20 are provided and the raw gas is heated.

In the apparatus for producing trichlorosilane 100 of trichlorosilane as constituted above, the raw gas that is supplied in the reaction vessel 10 through the raw gas supply pipe 14 fills the annular path 11c, and introduced to the cylindrical path 11a, so that the raw gas is introduced to the lower part 101A of the reaction chamber 101 through the gas introducing ports 11b.

The raw gas in the reaction chamber 101 is, for example, 400° C. to 700° C. The raw gas fills the space below the dispersing plate 40 (i.e., the lower part 101A) by the disturbing gas flow, and flows through the gas communicating holes 40a, so that the raw gas is distributed to the above of the dispersing plate 40 (i.e., the upper part 101B); and then the raw gas is heated by the heaters 20.

Since the radiation plates 24 that are provided in order that the exothermic portions 21 of the heaters 20 are not in face-to-face state each other are heated to a high temperature by the exothermic portions 21, the raw gas is heated by the radiation plates 24 likewise. Therefore, by the effect of the radiation plates 24, the raw gas can be effectively heated.

The reacted gas generated by the conversion reaction of the heated raw gas is, for example, 800° C. to 1100° C., and is discharged from the apparatus for producing trichlorosilane 100 of trichlorosilane through the gas-discharge port 15.

As described above, according to the apparatus for producing trichlorosilane 100 of trichlorosilane, by disposing the plurality of heaters 20 and the radiation plates 24 in the reaction chamber 101, the surfaces of the heaters 20 can be prevented from excessive heating. Moreover, the area of heat-transferring being heated in the reaction chamber 101 is increased, so that the heat is transferred to the raw gas flowing around. As a result, the raw gas can be heated with high thermal efficiency.

Since the electrodes 23 are also arranged in the reaction chamber 101, the joint portions of the electrodes 23 and the heaters 20 that are disposed in the lower part 101A of the reaction chamber 101 are also exposed to the raw gas. Therefore, impurities may be generated from the joint portions that are not coated by silicon carbide. However, in the apparatus for producing trichlorosilane 100 of trichlorosilane, the raw gas introducing port 101b is disposed at the lower part 101A of the reaction chamber 101, so that the comparative low temperature raw gas can be in contact with the joint portions. As a result, the joint portions can be prevented from increasing of temperature, so that the generation of impurities can be prevented.

The radiation plates 24 which are arranged between the heaters 20 need no constitution for electrical power supply, so that the constitution of the bottom of the reaction chamber 101 (i.e., the bottom plate 13) can be simplified. Therefore, the apparatus having a high workability of the fabrication and the checking or the like is achieved.

Figure 6:
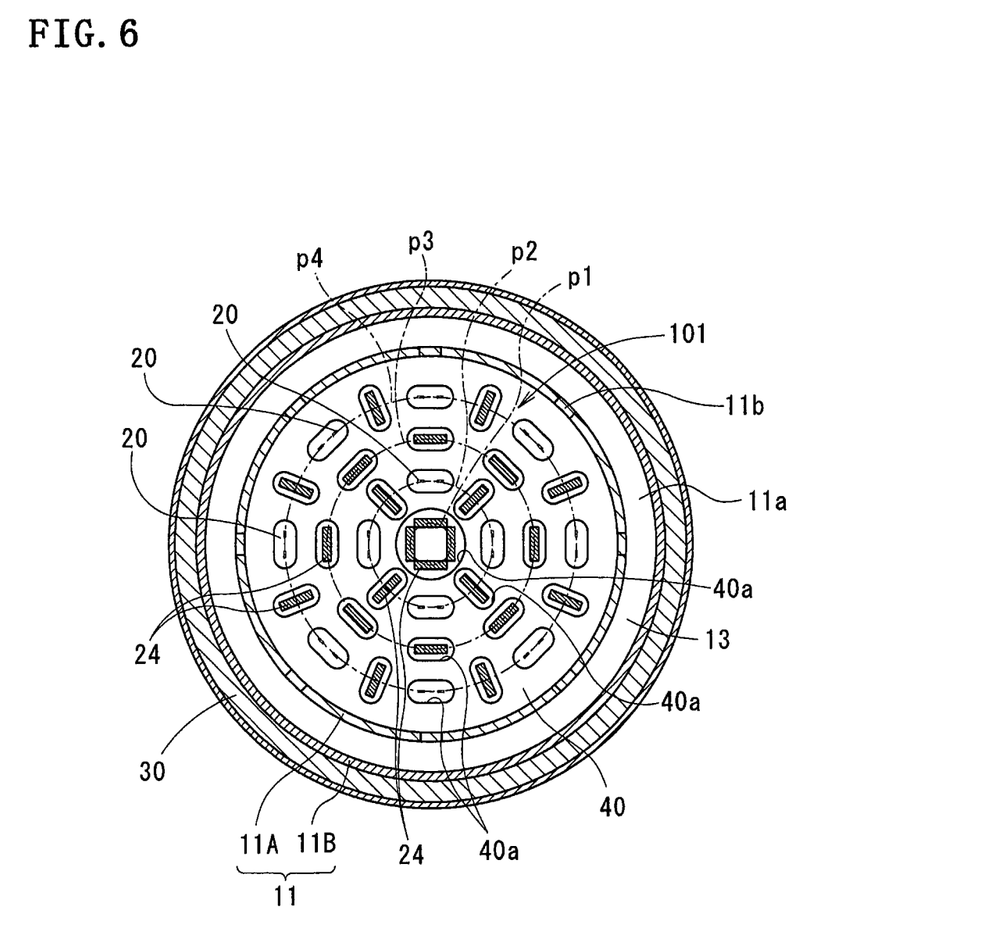
FIG. 6 is a transverse cross-sectional view showing an arrangement example of the heaters and the radiation plates.

FIG. 6 shows an example of another arrangement of the heaters 20 and the radiation plates 24. In this example, the radiation plates 24 are disposed between the heaters 20 in the circle p2 and the circle p4. That is to say, the radiation plates 24 are disposed between the heaters 20 adjacent along the circumferential direction and between the heaters 20 adjacent along the radial direction.

Figure 7:
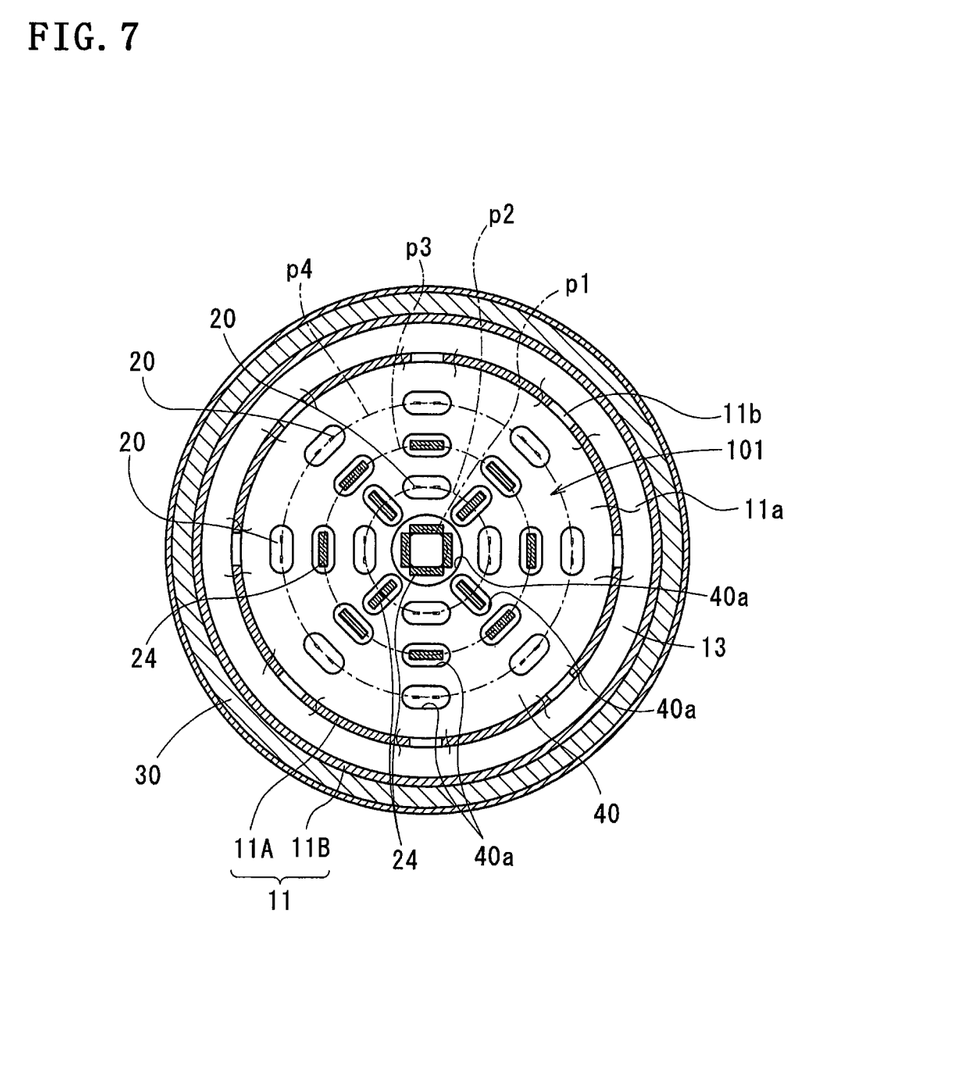
FIG. 7 is a transverse cross-sectional view showing another arrangement example of the heaters and the radiation plates.

FIG. 7 shows another arrangement example of the heaters 20 and the radiation plates 24. In this example, the radiation plates 24 are disposed between the heaters 20 in the circle p2, and disposed at the circle p1 and the circle p3.

Figure 8:
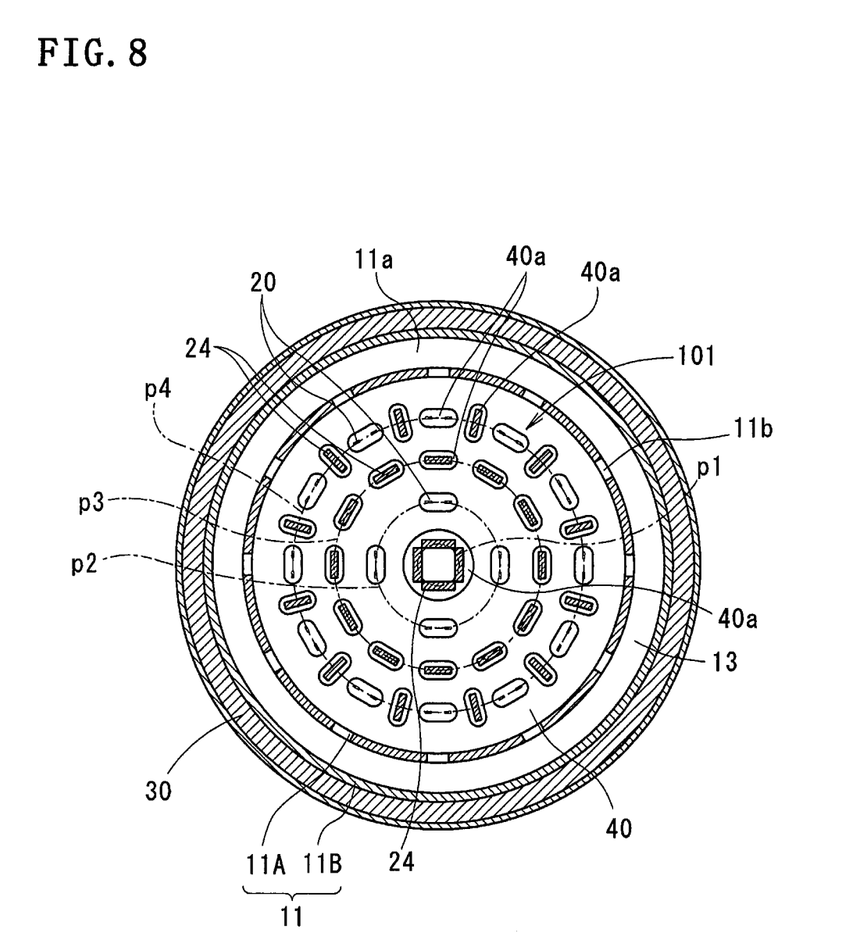
FIG. 8 is a transverse cross-sectional view showing another arrangement example of the heaters and the radiation plates.

FIG. 8 shows another arrangement example of the heaters 20 and the radiation plates 24. In this embodiment, the heaters 20 in the circle p4 are disposed so as to have small interval therebetween, and the number of the heaters 20 is large. Furthermore, the radiation plates 24 are disposed between the heaters 20 of the circle p4.

Figure 9:
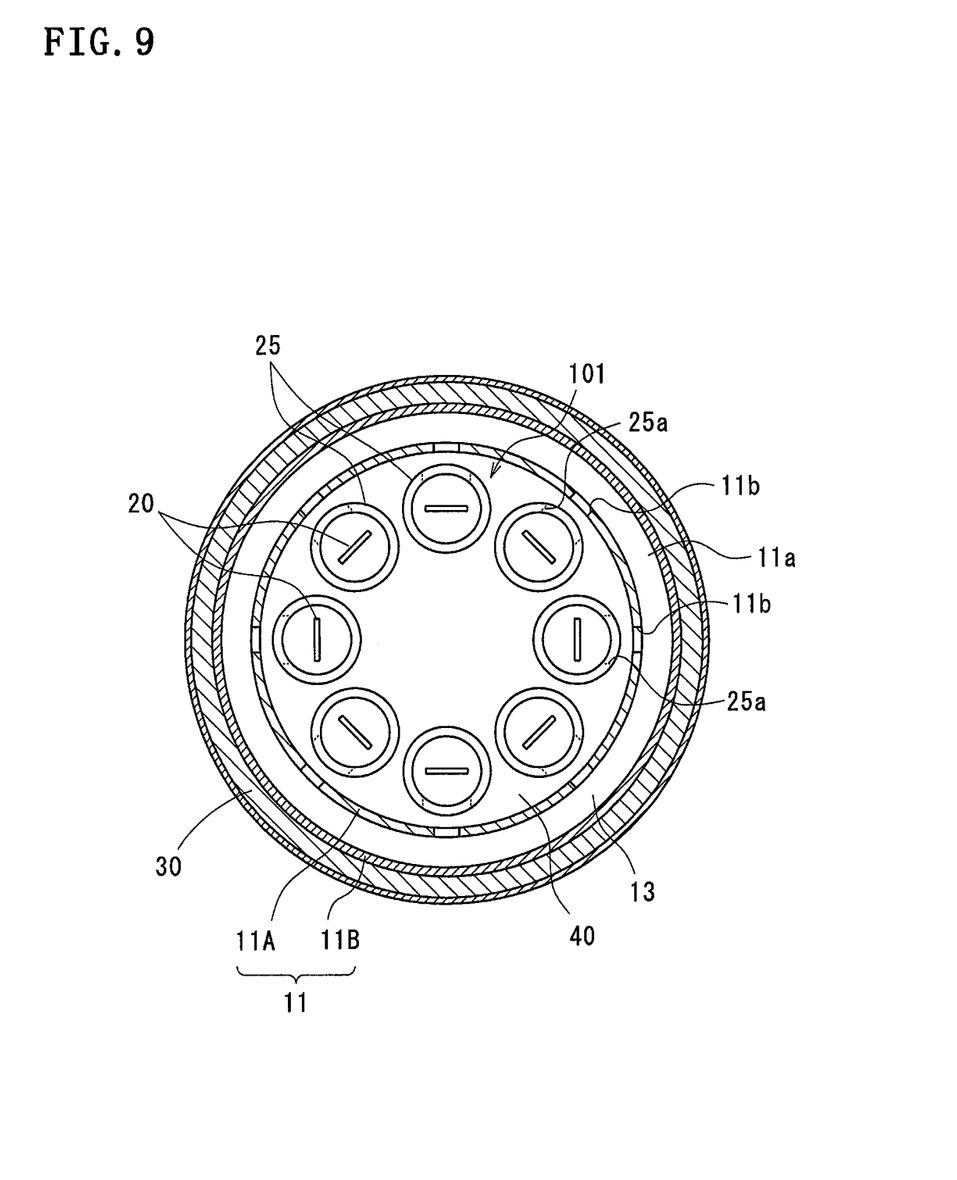
FIG. 9 is a cross-sectional view showing the second embodiment of the apparatus for producing trichlorosilane of the present invention.
Figure 10:
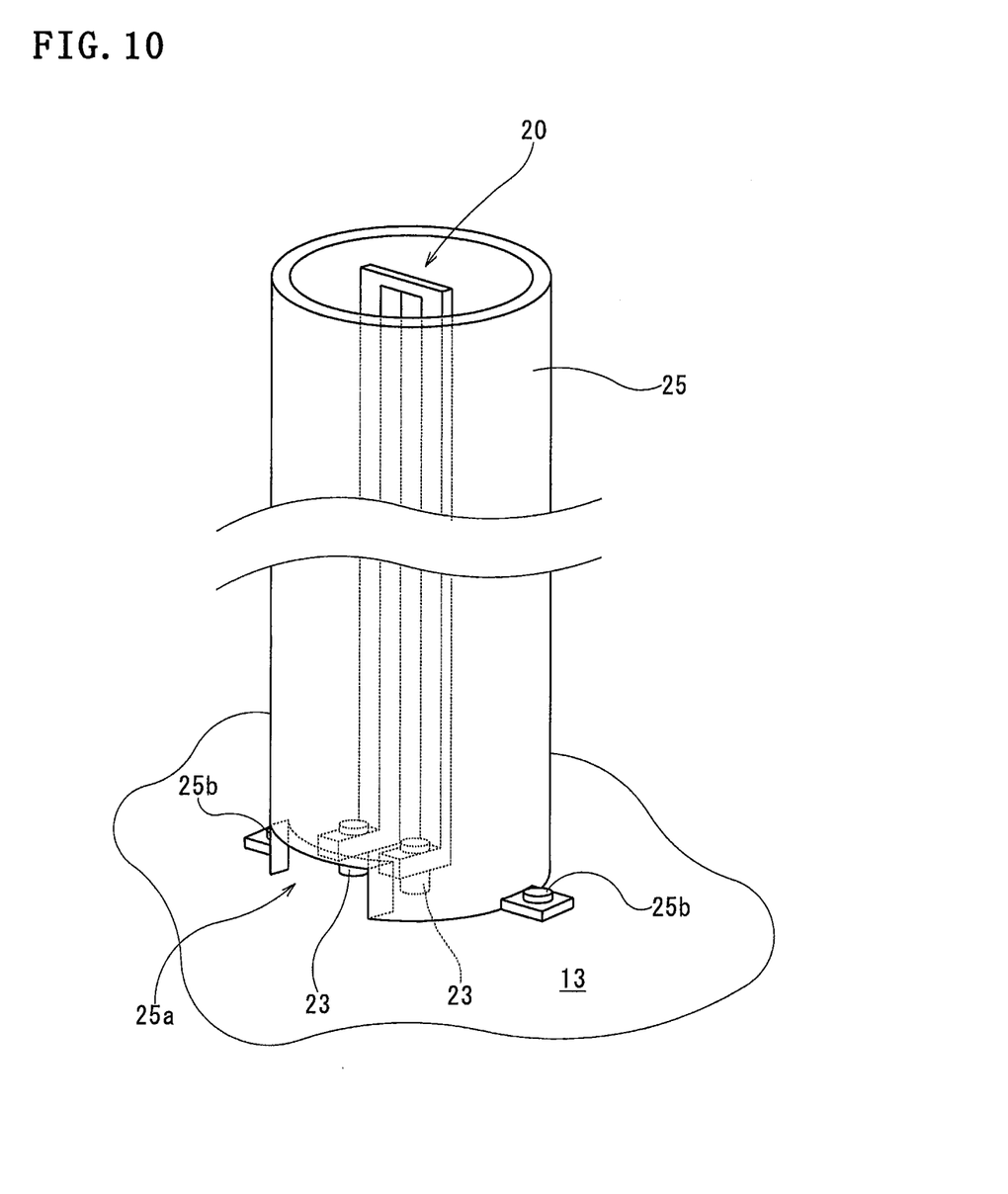
FIG. 10 is a perspective view showing the heater and the radiant cylinder of the second embodiment.

FIGS. 9 and 10 shows a second embodiment of the present invention. In the first embodiment, the radiation plates 24 are arranged between the heaters 20 disposed concentrically so that the exothermic portions 21 of the heaters 20 are not in face-to-face state each other, so that the radiation plates 24 surround the heaters 20. In the second embodiment, each of the heaters 20 is surrounded by a radiation tube 25 as a cylindrical radiation plate. The radiation tubes 25 are, as shown in FIG. 10, disposed on the bottom plate 13 and fixed to the bottom plate 13 by screws 25b.

At the lower part of the wall body 11 of the reaction chamber 101, as shown in FIG. 9, the gas introducing ports 11b introducing the raw gas is provided at intervals along the circumferential direction. In order to supply the raw gas efficiently to the heaters 20 through the gas introducing ports 11b, at the basal portion of the radiation cylinders 25, openings 25a which is faced toward the gas introducing ports 11b of the reaction chamber 101 are formed. In this case, the openings 25a may be formed only toward the gas introducing ports 11b, or may be formed across the radiation cylinders 25, penetrating from the gas introducing ports 11b to the other side. In this case, by the radiation cylinders 25, the raw gas is induced along the heaters 20 so as to be heated with high efficiency. Therefore, the dispersing plate 40 can be omitted.

By the plurality of the radiation cylinders 25 surrounding each of the heaters 20 in the reaction chamber 101, the raw gas is induced from the openings 25a of the basal portion of the radiation cylinders 25, and flows through the vertical space formed in the radiation cylinder 25 with the heater 20. Since the raw gas flows along the exothermic portions 21 of the heaters 20 and the inside of the radiation cylinders 25, the heat of the high temperature exothermic portions 21 and the radiation cylinders 25 is directly transferred to the raw gas, so that the raw gas can be heated with high thermal efficiency. As a result, the conversion rate to trichlorosilane can be improved.

The raw gas flowing along the outside of the radiation cylinders 25 is also heated by the outer surface of the radiation cylinders 25 and the inner wall 11A of the reaction chamber 101 that is heated by the radiation heat of the radiation cylinders 25.

The other constitution of the second embodiment is the same as that of the first embodiment. The same parts as that of the first embodiment are denoted by the same reference symbols, and the description thereof is omitted.

The present invention is not limited to the above-described embodiments and various modifications may be made without departing from the scope of the present invention.

For example, in the above embodiments, the heaters 20 are connected with each other at the electrodes 23 in the lower part 101A, and the raw gas is supplied from the lower part 101A of the reaction chamber 101. However, a constitution in which the electrodes are provided at an upper part of a reaction chamber and the raw gas is supplied from the upper part of the reaction chamber is available. In this case, the same advantages as the above embodiments of the present invention can be obtained by utilizing a constitution in which the heaters having exothermic portions extending from the upper part to the lower part, and in which the openings are formed at the upper part of the radiation cylinder.

What is claimed is:

1. An apparatus for producing trichlorosilane from raw gas including silicon tetrachloride and hydrogen, comprising:

a reaction chamber being supplied with the raw gas configured for generating reacted gas including trichlorosilane and hydrogen;

a plurality of heaters, each heater comprises:
a heating portion standing vertically with respect to a bottom of the reaction chamber, aligned on a first group of concentric circles in the reaction chamber, and formed in an inverted U-shape with comprising an inverted U-shaped heating surface; and
basal portions holding the heating portion;

a plurality of electrodes being connected to the basal portions of the heaters and supplying electrical current to each heating portion; and a plurality of radiation plates standing vertically with respect to the bottom of the reaction chamber in the reaction chamber, aligned on a second group of concentric circles, which are different from the first group of concentric circles, in the reaction chamber, shaped with a same height as the heating portion, disposed between two adjacent heating portions of the heaters facing each other in a radial direction, spaced from the heating portions, and each comprising a surface parallel facing the heating portion to decrease a block facing area of the two adjacent heating portions not to be in a face-to-face state, wherein the heating portions are heated by the electrical current supplied via the electrodes and the basal portions, and heat the raw gas;

the heating portions are obstructed by the radiation plates so as not to heat each other in a radical direction directly by radiation heat of the heating portions;

the radiation plates are directly heated by the radiation heat of the heating portions, and heat the raw gas.

2. The apparatus for producing trichlorosilane according to claim 1, wherein an introducing port communicating with a lower part of the reaction chamber and introducing the raw gas into the reaction chamber is provided at the lower part of the reaction chamber, and a joint portion of the heater and the electrode is arranged at the lower part of the reaction chamber so that the raw gas introduced into the reaction chamber through the introducing port immediately passes by the joint portion.

3. The apparatus for producing trichlorosilane according to claim 1, wherein the radiation plates are radiation cylinders, and every radiation cylinder surrounds one of the heating portions of the heaters.

4. The apparatus for producing trichlorosilane according to claim 3, wherein a plurality of gas introducing ports introducing the raw gas into the reaction chamber through a lower part of the reaction chamber are arranged at intervals at the lower part of the reaction chamber, and openings are each formed at each of the radiation cylinders so as to face toward each of the gas introducing ports.

5. The apparatus for producing trichlorosilane according to claim 1, wherein one of the radiation plates is disposed between two of the heating portions that are close to each other in a circumferential direction.

* * * * *